(12) United States Patent
Sato et al.

(10) Patent No.: US 8,850,896 B2
(45) Date of Patent: Oct. 7, 2014

(54) PHYSICAL QUANTITY DETECTOR

(71) Applicant: Seiko Epson Corporation, Tokyo (JP)

(72) Inventors: Kenta Sato, Shiojiri (JP); Naoki Kitahara, Minowa (JP)

(73) Assignee: Seiko Epson Corporation (JP)

( * ) Notice: Subject to any disclaimer, the term of this patent is extended or adjusted under 35 U.S.C. 154(b) by 151 days.

(21) Appl. No.: 13/673,243

(22) Filed: Nov. 9, 2012

(65) Prior Publication Data

US 2013/0118263 A1    May 16, 2013

(30) Foreign Application Priority Data

Nov. 11, 2011  (JP) ................................. 2011-248026

(51) Int. Cl.
*G01L 7/08* (2006.01)
*G01L 9/00* (2006.01)

(52) U.S. Cl.
CPC ................. *G01L 7/08* (2013.01); *G01L 9/0022* (2013.01)
USPC .................................. 73/715; 73/702; 73/753

(58) Field of Classification Search
None
See application file for complete search history.

(56) References Cited

U.S. PATENT DOCUMENTS

| | | | |
|---|---|---|---|
| 5,388,462 A * | 2/1995 | Delatorre ......................... 73/718 |
| 5,824,910 A * | 10/1998 | Last et al. ....................... 73/715 |
| 6,055,869 A * | 5/2000 | Stemme et al. ............ 73/861.71 |
| 6,422,077 B1 * | 7/2002 | Krauss et al. ............... 73/514.25 |
| 6,848,320 B2 * | 2/2005 | Miyajima et al. ............... 73/763 |
| 7,274,002 B2 * | 9/2007 | Stewart .......................... 219/209 |
| 7,461,559 B2 * | 12/2008 | Takizawa ......................... 73/777 |
| 7,475,597 B2 * | 1/2009 | Brida et al. ...................... 73/715 |
| 7,490,519 B2 * | 2/2009 | Subramanian et al. ......... 73/716 |
| 7,681,457 B2 * | 3/2010 | Jakobsen ......................... 73/721 |
| 7,779,700 B2 | 8/2010 | Motoyama |
| 8,015,881 B2 | 9/2011 | Motoyama |
| 8,096,187 B2 * | 1/2012 | Sato ................................. 73/717 |
| 8,390,782 B2 * | 3/2013 | Lyons ............................. 355/55 |
| 2010/0018318 A1 | 1/2010 | Watanabe et al. |

FOREIGN PATENT DOCUMENTS

| | | |
|---|---|---|
| JP | 57-188137 | 11/1982 |
| JP | 2010-019826 | 1/2010 |
| JP | 2010-019827 | 1/2010 |
| JP | 2010-048798 | 3/2010 |

* cited by examiner

*Primary Examiner* — Lisa Caputo
*Assistant Examiner* — Jermaine Jenkins
(74) *Attorney, Agent, or Firm* — Harness, Dickey & Pierce, P.L.C.

(57) ABSTRACT

A physical quantity detector includes a diaphragm including a displacement part that is displaced under external pressure, a ring-shaped fixing part that holds an outer circumferential part of the diaphragm, a holding member having a projection part that projects from an inner circumference of the fixing part toward a center at one surface side of the diaphragm, a support fixed to the projection part, and a pressure-sensitive device having a first base part fixed to the displacement part, a second base part fixed to the support, and a pressure-sensitive part provided between the base parts.

12 Claims, 12 Drawing Sheets

PHYSICAL QUANTITY DETECTOR

BACKGROUND

1. Technical Field

The present invention relates to a physical quantity detector (pressure sensor).

2. Related Art

As a physical quantity detector (pressure sensor) such as a water pressure gauge, a barometer, and a differential pressure gauge, the detector including a diaphragm that is deformed in response to received pressure and a piezoelectric vibrator that is subjected to stress with the deformation of the diaphragm, and detecting pressure based on the resonance frequency of the piezoelectric vibrator has been known (for example, see Patent Document 1 (JP-A-2010-48798)).

For example, in the pressure sensor disclosed in Patent Document 1, the diaphragm includes a flexible region having flexibility provided between a center region and an outer circumferential edge region, and the center region (displacement part) is displaced in response to the pressure in the thickness direction. Further, the piezoelectric vibrator has a pair of base parts and a vibrating part provided between the pair of base parts. Further, the pair of base parts are provided in line in the direction in which the diaphragm deflects, and one base part is connected to the center region of the diaphragm and the other base part is connected to the outer circumferential region of the diaphragm via a columnar support member.

In the pressure sensor disclosed in Patent Document 1, the support member is formed integrally with the piezoelectric vibrator. The support member and the piezoelectric vibrator are formed using the same material, and thereby, the error of the detected pressure due to the difference in coefficient of linear expansion between the support member and the piezoelectric vibrator (the error due to thermal strain) may be reduced.

However, in the pressure sensor disclosed in Patent Document 1, the support member is connected to the diaphragm, and there is a problem that unintended displacement and deformation of the support member are produced with the deformation of the diaphragm and, as a result, reduction in detection accuracy is caused.

If high stiffness is provided to the outer circumferential edge region of the diaphragm, the length of the support member in the direction orthogonal to the direction in which the diaphragm deflects becomes longer and unintended displacement and deformation of the support member may be easily produced and the reduction in detection accuracy may be caused.

SUMMARY

An advantage of some aspects of the invention is to provide a physical quantity detector having advantageous detection accuracy.

The invention can be implemented as the following forms or application examples.

APPLICATION EXAMPLE 1

A physical quantity detector according to this application example of the invention includes a pressure receiving unit including a displacement part that is displaced under pressure and an outer circumferential part provided on an outer circumference of the displacement part, a holding member including a fixing part in an circumferential shape in a plan view, and a projection part that projects from an inner circumference of the fixing part toward a center in the plan view, the projection part having an opening and provided on one surface side of the pressure receiving unit, and the fixing part holding the outer circumferential part so that at least one part of the displacement part at the one surface side of the pressure receiving unit may be located within the opening in the plan view from the projection part side, a support fixed to the projection part, and a pressure-sensitive device including a first base part fixed to the at least one part of the displacement part, a second base part fixed to the support, and a pressure-sensitive part provided between the first base part and the second base part, the first base part and the second base part are stood in line in a direction in which the displacement part is displaced.

According to the physical quantity detector (pressure sensor) having the above described configuration, the support is fixed to the holding member, and thus, unintended deformation or displacement of the support may be prevented or suppressed compared to the case where the support is fixed to the pressure receiving unit.

Specifically, the support is fixed to the projection part provided at the inner side than the fixing part of the holding member, and thus, the space between the support and the piezoelectric vibrator may be made smaller. As a result, the stiffness of the support may be improved, and the unintended deformation or displacement of the support may be effectively prevented or suppressed.

Further, the end of the support at the opposite side to the holding member may be downsized, and the deformation of the support due to acceleration may be prevented or suppressed.

Furthermore, the holding member has the projection part, and thus, the stiffness of the holding member may be improved. Accordingly, also, unintended deformation of the pressure receiving unit and the support due to the deformation of the holding member may be prevented.

In addition, the first base part and the second base part are provided in line in the direction in which the displacement part is displaced, and thus, when the displacement part is displaced toward the piezoelectric vibrator side, the vibrating part of the piezoelectric vibrator is subjected to compressive stress, and the resonance frequency of the vibrating part becomes lower. On the other hand, when the displacement part is displaced to the opposite side to the piezoelectric vibrator, the vibrating part of the piezoelectric vibrator is subjected to tensile stress, and the resonance frequency of the vibrating part becomes higher. Accordingly, the pressure may be detected based on the resonance frequency of the vibrating part.

According to the configuration, the pressure sensor according to the application example of the invention may exert the advantageous sensing accuracy.

APPLICATION EXAMPLE 2

In the physical quantity detector according to the above application example of the invention, it is preferable that the projection part is provided in an annular shape in the fixing part.

Thereby, the stiffness of the holding member may be effectively improved while the connection between the first base part of the piezoelectric vibrator and the pressure receiving unit is permitted through the inside of the projection part.

APPLICATION EXAMPLE 3

In the physical quantity detector according to the above application example of the invention, it is preferable that the support includes a column member stood in the projection part, and a beam member connecting the column member and the second base part.

Thereby, the first base part and the second base part may be provided in line in the direction in which the displacement part is displaced by the simpler configuration.

APPLICATION EXAMPLE 4

In the physical quantity detector according to the above application example of the invention, it is preferable that the column member is provided within a region where the displacement part is displaced in the plan view from the direction in which the displacement part is displaced.

Thereby, the area of the displacement part may be secured to be larger and the space between the support and the piezoelectric vibrator may be suppressed.

APPLICATION EXAMPLE 5

In the physical quantity detector according to the above application example of the invention, it is preferable that a direction in which a fixing part of the projection part where the support is fixed and the first base part are arranged is orthogonal to the direction in which the displacement part is displaced.

Thereby, the lengths of the column member and the piezoelectric vibrator in the direction in which the displacement part is displaced may be made equal by the simpler configuration.

APPLICATION EXAMPLE 6

In the physical quantity detector according to the above application example of the invention, it is preferable that a fixing member joined to the displacement part is provided, wherein the first base part is fixed to the fixing member.

Thereby, the lengths of the column member and the piezoelectric vibrator in the direction in which the displacement part is displaced may be made equal by the simpler configuration.

APPLICATION EXAMPLE 7

In the physical quantity detector according to the above application example of the invention, it is preferable that the column member and the beam member are formed using different materials from each other.

Thereby, the column member and the beam member may be respectively formed using materials having desired coefficients of thermal expansion.

APPLICATION EXAMPLE 8

In the physical quantity detector according to the above application example of the invention, it is preferable that the pressure-sensitive device is formed using a piezoelectric material, and the column member is formed using a material having a coefficient of thermal expansion equal to or close to that of the piezoelectric material.

Thereby, the thermal strain of the piezoelectric vibrator may be prevented or suppressed.

APPLICATION EXAMPLE 9

In the physical quantity detector according to the above application example of the invention, it is preferable that the beam member is formed using a material having a coefficient of thermal expansion equal to or close to that of at least one of the holding member and the pressure receiving unit.

Thereby, the thermal strain of the piezoelectric vibrator may be prevented or suppressed.

APPLICATION EXAMPLE 10

In the physical quantity detector according to the above application example of the invention, it is preferable that the holding member is formed using a material having a coefficient of thermal expansion equal to or close to that of a constituent material of the pressure receiving unit.

Thereby, the thermal strain of the pressure receiving unit may be prevented or suppressed.

APPLICATION EXAMPLE 11

In the physical quantity detector according to the above application example of the invention, it is preferable that the pressure-sensitive part includes one or more vibration beams.

Thereby, the pressure sensor with advantageous resolution may be realized.

APPLICATION EXAMPLE 12

In the physical quantity detector according to the above application example of the invention, it is preferable that the pressure-sensitive device is a thickness-shear mode vibrator.

Thereby, the pressure sensor with advantageous temperature characteristic may be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a physical quantity detector (pressure sensor) of the invention will be explained in detail according to embodiments shown in the accompanying drawings.

First Embodiment

Figure 1:
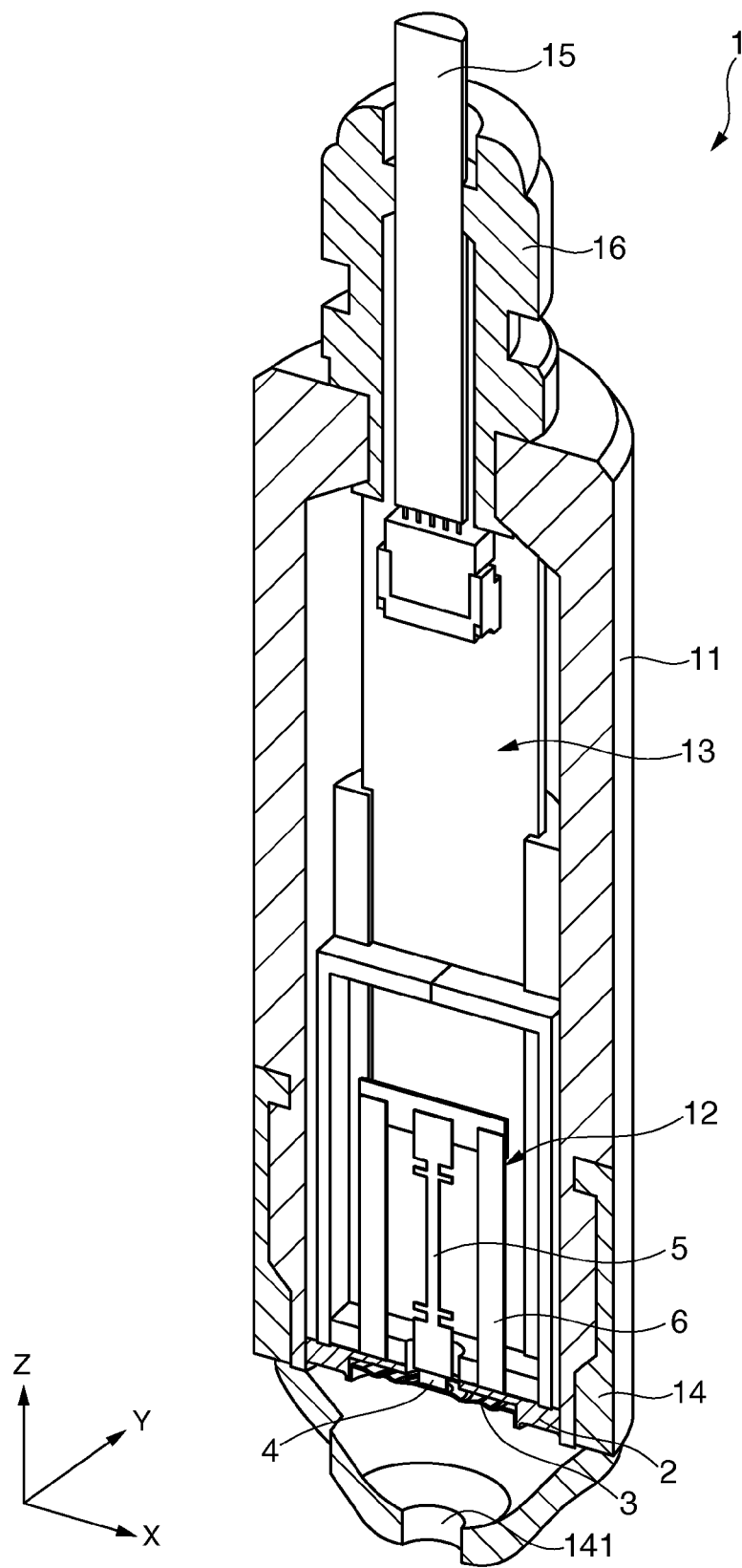
FIG. 1 shows an overall configuration of a physical quantity detector (pressure sensor) according to a first embodiment of the invention.
Figure 2:
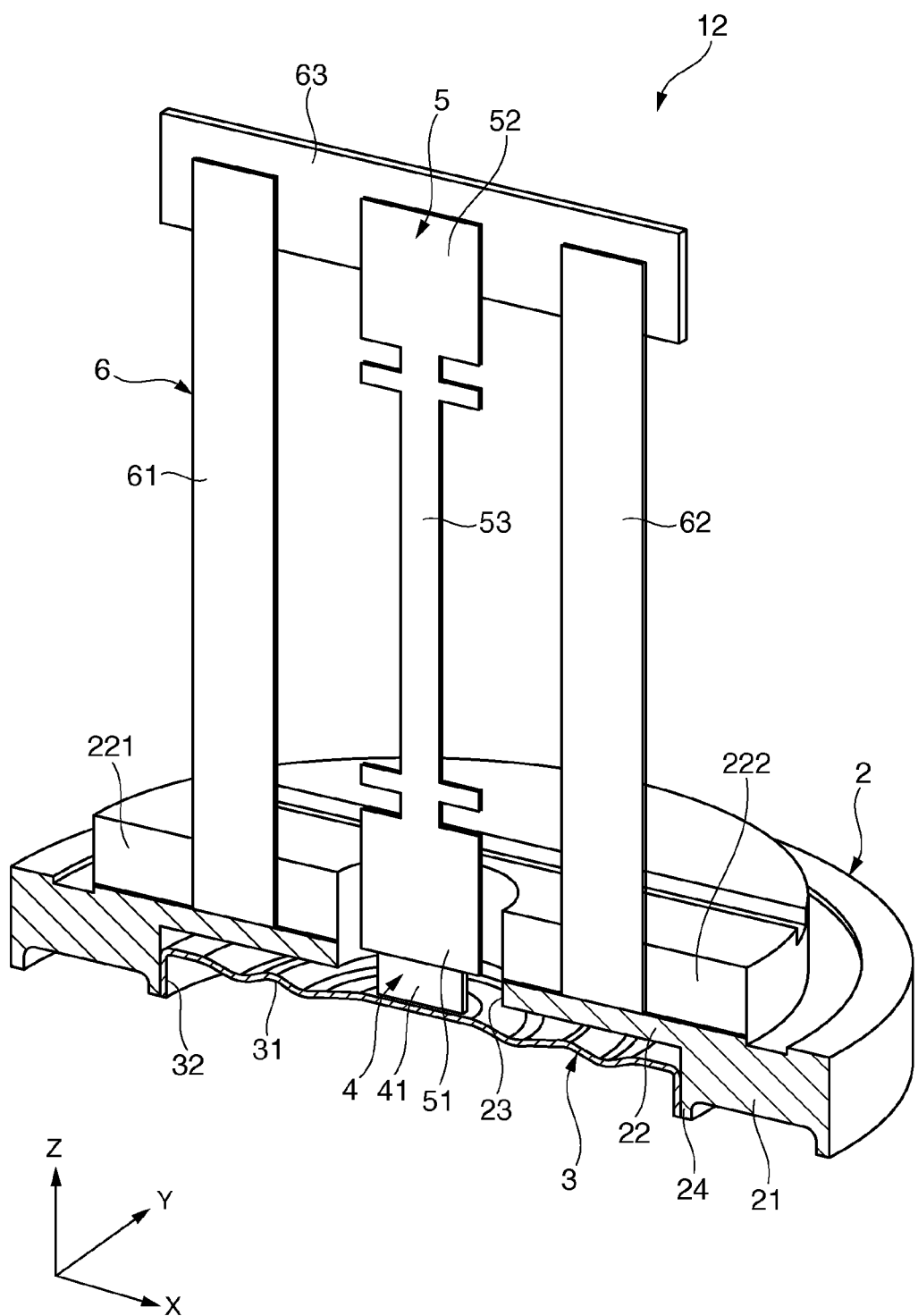
FIG. 2 is a perspective view of a pressure-sensitive unit provided in the pressure sensor shown in FIG. 1.
Figure 3:
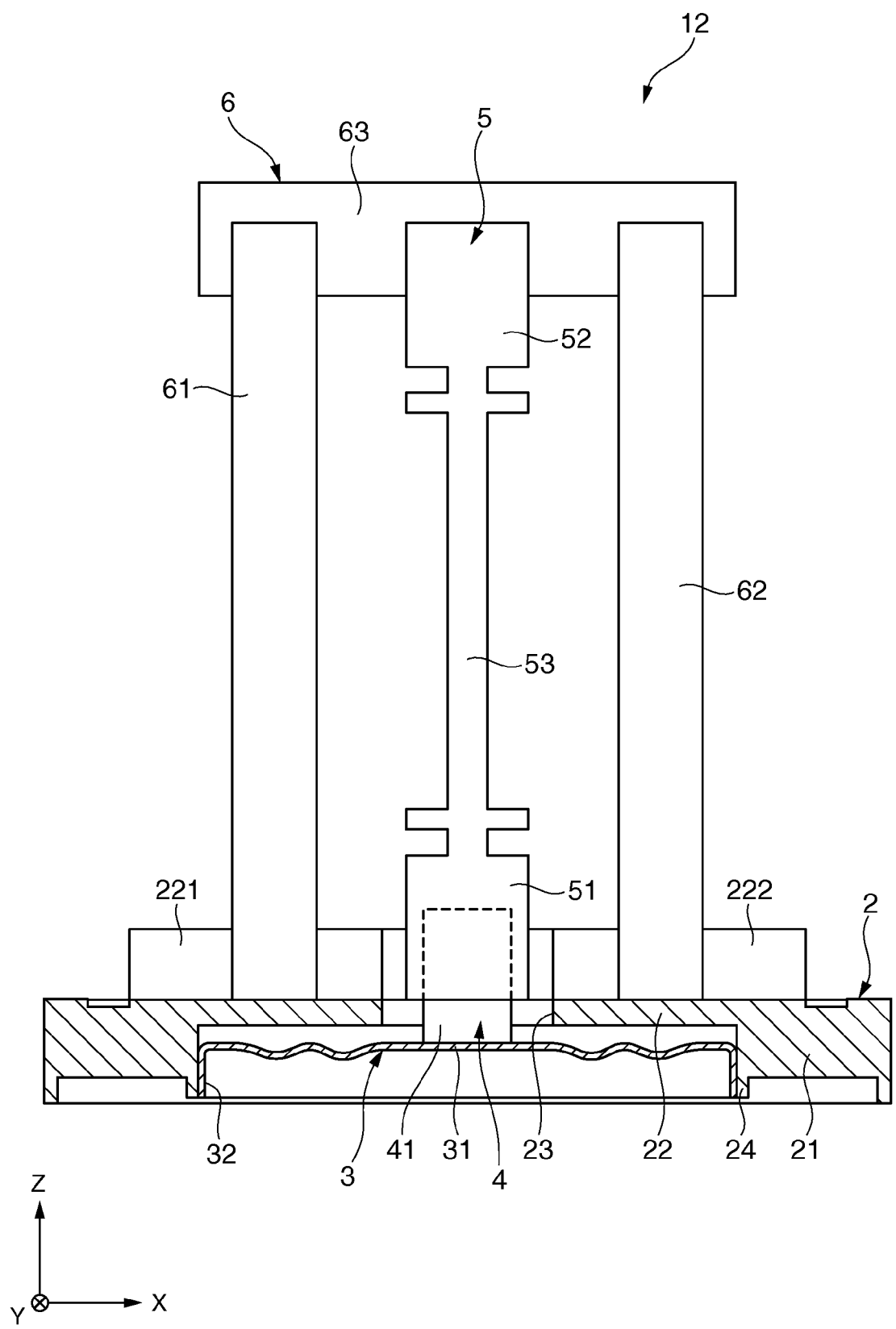
FIG. 3 is a side view of the pressure-sensitive unit shown in FIG. 2.

FIG. 1 shows an overall configuration of a physical quantity detector (pressure sensor) according to the first embodiment of the invention, FIG. 2 is a perspective view of a pressure-sensitive unit provided in the pressure sensor shown in FIG. 1, and FIG. 3 is a side view of the pressure-sensitive unit shown in FIG. 2.

Note that, in FIGS. 1 to 3, for convenience of explanation, an X-axis, a Y-axis, and a Z-axis are shown as three axes orthogonal to one another. Further, in the following explanation, for convenience of explanation, the direction in parallel to the X-axis is referred to as "X-axis direction", the direction in parallel to the Y-axis is referred to as "Y-axis direction", and the direction in parallel to the Z-axis is referred to as "Z-axis direction". Furthermore, the upper side (+Z side) is referred to as "up" and the lower side is referred to as "down" in FIGS. 1 to 3.

The physical quantity detector (pressure sensor) shown in FIG. 1 detects pressure of a fluid such as a gas or a liquid. The pressure sensor 1 includes a housing 11, a pressure-sensitive unit 12, a circuit unit 13, a cap 14, a cable 15, and a sealing member 16 as shown in FIG. 1.

First, the configurations of the respective parts forming the pressure sensor 1 will be briefly explained with reference to FIG. 1.

The housing 11 has a cylindrical shape with a bottom.

The constituent material of the housing 11 is not particularly limited, but a resin material, a metal material, a ceramics material, or the like may be cited, for example.

Within the housing 11, the pressure-sensitive unit 12 and the circuit unit 13 are provided.

The pressure-sensitive unit 12 includes a holding member 2, a diaphragm (pressure receiving unit) 3, a fixing member 4, a piezoelectric vibrator 5 as a pressure-sensitive device, and a support 6.

The holding member 2 and the diaphragm 3 seal one end opening of the housing 11.

Further, the fixing member 4, the piezoelectric vibrator 5, and the support 6 are provided inside of the housing 11. Furthermore, the piezoelectric vibrator 5 is connected to the diaphragm 3 via the fixing member 4 and connected to the holding member 2 via the support 6.

In the pressure-sensitive unit 12, the resonance frequency of the piezoelectric vibrator 5 changes in response to the pressure received by the diaphragm 3. Note that the configuration of the pressure-sensitive unit 12 will be described later in detail.

Further, the cap 14 is attached to one end of the housing 11. In the cap 14, a communication hole 141 through which a fluid can communicate is formed. Thereby, the pressure of the fluid flowing into the cap 14 via the communication hole 141 is applied to the diaphragm 3 of the pressure-sensitive unit 12.

Furthermore, the circuit unit 13 is electrically connected to the piezoelectric vibrator 5 of the pressure-sensitive unit 12 via wiring (not shown).

The circuit unit 13 includes a circuit board, an electronic component (IC), etc., for example. Further, the circuit unit 13 has a function of driving the piezoelectric vibrator 5 and a function of detecting the pressure based on the resonance frequency of the piezoelectric vibrator 5.

The circuit unit 13 is electrically connected to a device (not shown) provided outside of the housing 11 via the cable 15. Thereby, the detection result of the pressure sensor 1 may be acquired by the device.

The cable 15 is inserted into a through hole formed at the other end of the housing 11.

Further, the part between the cable 15 and the housing 11 is sealed by the sealing member 16 formed using a rubber material, for example.

In the pressure sensor 1, the internal space of the housing 11 is sealed in a decompressed state or an inert gas enclosed state.

Here, the configuration of the pressure-sensitive unit 12 will be described in detail with reference to FIGS. 2 and 3.

As described above, the pressure-sensitive unit 12 includes the holding member 2, the diaphragm 3, the fixing member 4, the piezoelectric vibrator 5, and the support 6.

As below, the respective parts forming the pressure-sensitive unit 12 will be sequentially explained in detail.

Holding Member

The holding member 2 holds the diaphragm 3.

The holding member 2 has a ring-shaped fixing part 21 that holds the outer circumferential part of the diaphragm 3, and a projection part 22 that projects from the fixing part 21 inward at one surface side (the upper side in FIG. 2) of the diaphragm 3.

The fixing part 21 is joined to the one end opening of the above described housing 11. The joint of the fixing part 21 and the housing 11 is performed by welding, a brazing filler metal, an adhesive, or the like, for example, and is preferably liquid-tight or air-tight joint.

Further, a protrusion 24 that protrudes downward over the entire circumference is formed in the inner circumferential part of the fixing part 21.

The protrusion 24 is a part to be joined by welding to an outer circumferential part 32 of the diaphragm 3, which will be described later. Specifically, the protrusion 24 is formed to have a thin thickness (narrow width). Thereby, the protrusion 24 and the diaphragm 3 may be joined by welding with a relatively small amount of heat.

Further, the width (thickness) of the protrusion 24 is determined according to the thickness of the outer circumferential part (welded part) of the diaphragm. 3, and not particularly limited, but preferably from 0.1 mm to 2 mm and more preferably from 0.1 mm to 1 mm. In this regard, if the width is too thin, the mechanical strength of the joint part of the holding member 2 and the diaphragm 3 may be lower. On the other hand, if the width is too thick, there is a tendency that the amount of heat by the welding of the holding member 2 and the diaphragm 3 becomes larger and the residual stress generated in the diaphragm 3 after welding becomes larger.

Furthermore, the height of the protrusion 24 (the amount of protrusion in the −Z direction) is determined according to the dimensions of the diaphragm 3, the welding margin, or the like, and not particularly limited, but preferably from 0.1 mm to 2 mm and more preferably from 0.1 mm to 1 mm. In this regard, if the height is too low, there is a tendency that the amount of heat by the welding of the holding member 2 and the diaphragm 3 becomes larger and the residual stress generated in the diaphragm 3 after welding becomes larger. On the other hand, if the height is too high, the mechanical strength of the joint part of the holding member 2 and the diaphragm 3 may be lower depending on the width or the constituent material of the protrusion 24, or the like.

On the upper side of the fixing part 21 (the opposite side to the diaphragm. 3), the projection part 22 that projects inward (toward the center side) is provided.

To the projection part 22, column members 61, 62 of the support 6, which will be described later, are fixed. Thereby, the detection accuracy of the pressure sensor 1 may be made better.

Further, since the holding member 2 has the projection part 22, the stiffness of the holding member 2 may be improved. Accordingly, unintended deformation of the diaphragm 3 and the support 6 due to deformation of the holding member 2 may be prevented.

Furthermore, the projection part 22 is formed over the entire circumference of the fixing part 21 and has an annular shape. Thereby, the stiffness of the holding member 2 may be effectively improved while the connection between a base part 51 of the piezoelectric vibrator 5 and the diaphragm is permitted through an opening part 23 inside of the projection part 22.

In addition, the projection part 22 has surfaces (a joint surface, a fixing part) 221, 222 for joining the column members 61, 62 of the support 6, which will be described later. The surfaces 221, 222 are respectively formed in parallel to the XZ plane.

As the constituent material of the holding member 2, not particularly limited, but a material with advantageous corrosion resistance is preferably used, and, for example, a metal material such as stainless, a ceramics material, or the like is preferably used.

Further, as the constituent material of the holding member 2, a material with a coefficient of thermal expansion equal to or close to that of the constituent material of the diaphragm 3, which will be described later, is preferably used. Thereby, the thermal strain of the diaphragm may be prevented or suppressed. Furthermore, by using a material equal to or close to the constituent material of the holding member 2 or the diaphragm 3 for the constituent material of a beam member 63 of the support 6, which will be described later, the thermal strain of the piezoelectric vibrator 5 may be reduced.

Note that the holding member 2 is formed separately from the housing 11 in the embodiment, however, may be integrally formed with the housing 11. That is, the fixing part 21 and the projection part 22 may be a part of the housing 11.

Diaphragm

The diaphragm 3 has a displacement part 31 as a pressure receiving unit that is displaced by receiving external pressure or force, and an outer circumferential part 32 provided in the outer circumference of the displacement part 31.

The displacement part 31 has the outer circumferential part that is deflectably deformed so that its center part may be displaced in the Z-axis direction (the thickness direction of the displacement part 31).

Further, the displacement part 31 is apart from the projection part 22 of the above described holding member 2 in the Z-axis direction. Thereby, the displacement of the displacement part 31 in the Z-axis direction is permitted.

The outer circumferential part 32 is a part joined to the fixing part 21 of the above described holding member 2 by welding.

The outer circumferential part 32 projects downward (+Z-axis direction) from the outer circumferential part of the displacement part 31. By providing the outer circumferential part 32, the stiffness of the diaphragm 3 may be improved, unintended deformation of the diaphragm 3 may be suppressed, and the area of the joint part (welding margin) of the diaphragm 3 and the holding member 2 may be increased.

Specifically, the outer circumferential part 32 is formed to have a thin thickness (narrow width). Thereby, the outer circumferential part 32 and the holding member 2 may be joined by welding with the relatively small amount of heat.

Further, the width (thickness) of the outer circumferential part 32 is not particularly limited, but preferably equal to the thickness of the displacement part 31 in view of ease of manufacturing of the diaphragm 3, and preferably from 0.1 mm to 2 mm and more preferably from 0.1 mm to 1 mm. In this regard, if the width is too thin, the joint strength of the joint part of the holding member 2 and the diaphragm. 3 and the mechanical strength of the diaphragm 3 may be lower. On the other hand, if the width is too thick, there is a tendency that the amount of heat by the welding of the holding member 2 and the diaphragm 3 becomes larger and the residual stress generated in the diaphragm 3 after welding becomes larger.

Furthermore, the height of the outer circumferential part 32 (the amount of protrusion in the −Z direction) is determined according to the dimensions of the diaphragm. 3, the welding margin, or the like, and not particularly limited, but preferably from 0.1 mm to 2 mm and more preferably from 0.1 mm to 1.5 mm. In this regard, if the height is too low, reduction in detection accuracy of the pressure sensor 1 may be caused by the unintended deformation of the diaphragm 3 welded to the holding member 2 and the joint strength of the joint part of the diaphragm 3 and the holding member 2 may be lower. On the other hand, if the height is too high, the holding member 2 may be upsized and the manufacturing of the diaphragm 3 may be difficult.

As the constituent material of the diaphragm 3, not particularly limited, but a material with advantageous corrosion resistance is preferably used, and, for example, a metal material such as stainless, a ceramics material, or the like is preferably used. In the case where the diaphragm 3 is formed using a metal material, the diaphragm. 3 may be formed by press working of a metal plate. Further, the diaphragm 3 may be formed using a single crystal such as crystal or silicon. In this case, the diaphragm 3 may be formed by etching of the single crystal.

Fixing Member

The fixing member 4 is joined (fixed) to the center part of the upper surface of the above described diaphragm 3. Further, the fixing member 4 is inserted into the opening part 23 of the above described holding member 2.

To the fixing member 4, the base part 51 of the piezoelectric vibrator 5, which will be described later, is joined.

The fixing member 4 has a surface (joint surface) 41 for fixing the base part 51 of the piezoelectric vibrator 5, which will be described later, to the diaphragm 3. The surface 41 is formed in parallel to the XZ plane.

By fixing the piezoelectric vibrator 5 to the diaphragm. 3 via the fixing member 4, the lengths of the column members 61, 62 of the support 6, which will be described later, and the piezoelectric vibrator 5 in the direction (Z-axis direction) in which the displacement part 31 of the diaphragm 3 is displaced may be made equal by a simpler configuration.

More specifically, the position of the lower end of the piezoelectric vibrator 5 and the positions of the lower ends of the column members 61, 62 in the Z-axis direction may be made the same. In other words, the direction in which the fixing part of the projection part 22 to which the support 6 is fixed and the base part 51 of the piezoelectric vibrator 5 are arranged is orthogonal to the direction in which the displacement part 31 is displaced. Accordingly, the length of the piezoelectric vibrator 5 and the lengths of the column members 61, 62 in the Z-axis direction may be made equal and the position of the upper end of the piezoelectric vibrator 5 and the positions of the upper ends of the column members 61, 62 in the Z-axis direction may be made the same.

As a result, by forming the piezoelectric element of the piezoelectric vibrator 5 and the column members 61, 62 using the same material (the material having the same coefficient of linear expansion), the amount of thermal expansion or the amount of thermal contraction of the piezoelectric vibrator 5 and the column members 61, 62 in the Z-axis direction may be made equal.

Further, by joining the piezoelectric vibrator 5 to the surface 41 of the fixing member 4, the piezoelectric vibrator 5 may be provided so that the principal surface of the piezoelectric vibrator 5 may be in parallel to the XZ plane.

As the constituent material of the fixing member 4, not particularly limited, but the same material as the constituent material of the diaphragm 3 may be preferably used in view of reduction of the difference in coefficient of thermal expansion between the diaphragm 3 and the fixing member 4.

Piezoelectric Vibrator

The piezoelectric vibrator 5 as the pressure-sensitive device is joined to the surface 41 of the above described fixing member 4. That is, the piezoelectric vibrator 5 is connected to the center part (displacement part 31) of the diaphragm 3 via the fixing member 4. Thereby, the piezoelectric vibrator 5 is subjected to compressive stress or tensile stress in the Z-axis direction due to deflection deformation of the diaphragm 3.

The piezoelectric vibrator 5 has a pair of base parts 51, 52 provided apart from each other, and a vibrating part 53 (pressure-sensitive part) provided between the pair of base parts 51, 52 and excited into vibration.

The base part (first base part) 51 is joined (fixed) to the surface 41 of the above described fixing member 4. Thereby, the base part 51 is fixed to the displacement part 31 of the diaphragm 3.

On the other hand, the base part (second base part) 52 is joined (fixed) to the beam member 63 of the support 6, which will be described later. Thereby, the base part 52 is fixed to the support 6, which will be described later.

The base part 51 and the base part 52 are connected via the vibrating part (pressure-sensitive part) 53.

The vibrating part 53 has an elongated shape and extends along the Z-axis direction.

Note that, in the illustrated example, the case where the vibrating part 53 includes a single vibration beam is shown, however, the vibrating part 53 may include two vibration beams. That is, as the piezoelectric vibrator 5, the so-called double-ended tuning fork vibrator may be used. In the double-ended tuning fork vibrator, the change of the resonance frequency with respect to the extensional and compressive stress is extremely larger and the variable range of the resonance frequency is larger than those of a thickness-shear mode vibrator, and the double-ended tuning fork vibrator is preferable in a high-accuracy pressure sensor advantageous in resolution performance for detecting a slight pressure difference. Further, the vibrating part 53 may include three or more vibration beams.

For the piezoelectric vibrator 5 as the pressure-sensitive device, a piezoelectric material such as crystal, lithium niobate, or lithium tantalum may be used.

Further, not limited to the vibrator including the vibration beams, but any piezoelectric vibrator having a resonance frequency changing depending on extensional and compressive stress may be used for the vibrating part 53 as the pressure-sensitive part of the pressure-sensitive device and, for example, a thickness-shear mode vibrator, a SAW resonator, or the like may be used.

By employing an AT-cut crystal vibrator having a thickness-shear mode as the main vibration for the vibrating part 53, the frequency-temperature characteristic is expressed by a three-dimensional curve, and the pressure sensor with advantageous frequency-temperature characteristic compared to a tuning-fork vibrator having a frequency-temperature characteristic in a two-dimensional curve convex upward may be realized.

Further, when the SAW resonator is used for the vibrating part 53, it is necessary to form a comb-shaped electrode, the so-called IDT (interdigital transducer) as an excitation electrode only on one principal surface of a piezoelectric substrate of crystal or the like, and the lower cost may be expected in manufacture.

In the vibrating part 53, a pair of excitation electrodes (not shown) are provided and the pair of excitation electrodes are electrically connected to the above described circuit unit 13 via wiring (not shown). Thereby, the circuit unit 13 applies a voltage between the pair of excitation electrodes to excite vibration in the vibrating part 53.

The piezoelectric vibrator 5 vibrates at the natural resonance frequency of the vibrating part 53.

Further, the pair of base parts 51, 52 are provided in line in the direction in which the displacement part 31 of the diaphragm 3 is displaced, i.e., in the Z-axis direction, and thus, when the displacement part 31 is displaced toward the piezoelectric vibrator 5 side, the vibrating part 53 of the piezoelectric vibrator 5 is subjected to the compressive stress in the Z-axis direction (the stress in the directions in which the base part 51 and the base part 52 come closer), and the resonance frequency of the vibrating part 53 becomes lower. On the other hand, when the displacement part 31 is displaced to the opposite side to the piezoelectric vibrator 5, the vibrating part 53 of the piezoelectric vibrator 5 is subjected to the tensile stress in the Z-axis direction (the stress in the directions in which the base part 51 and the base part 52 separate), and the resonance frequency of the vibrating part 53 becomes higher. Accordingly, the pressure may be detected based on the resonance frequency of the vibrating part.

Support

The support 6 is fixed to the surfaces 221, 222 of the projection part 22 of the above described holding member 2. Further, the base part 52 of the above described piezoelectric vibrator 5 is fixed to the support 6. Thereby, the base part 52 of the piezoelectric vibrator 5 is connected to the holding member 2 via the support 6.

The support 6 is fixed to the holding member 2, and thus, unintended deformation or displacement of the support 6 may be prevented or suppressed compared to the case where the support 6 is fixed to the diaphragm 3.

Specifically, the support 6 is fixed to the projection part 22 provided at the inner side than the fixing part 21 of the holding member 2, and thus, the space between the support 6 and the piezoelectric vibrator 5 may be made smaller. As a result, the stiffness of the support 6 may be improved, and the unintended deformation or displacement of the support 6 may be effectively prevented or suppressed.

Further, the end of the support 6 at the opposite side to the holding member 2 (specifically, the beam member 63, which will be described later) may be downsized, and the deformation of the support 6 due to acceleration may be prevented or suppressed.

The support 6 has the column members 61, 62 stood on the projection part 22, and the beam member 63 that connects the ends of the column members 61, 62 and the base part 52 of the piezoelectric vibrator 5. Thereby, the pair of base parts 51, 52 of the piezoelectric vibrator 5 may be provided in line in the direction in which the displacement part 31 of the diaphragm 3 is displaced (Z-axis direction) by the relatively simple configuration.

The column member 61 is joined to the surface 221 of the holding member 2, and the column member 62 is joined to the surface 222 of the holding member 2.

Further, the column members 61, 62 are located inside of the displacement part 31 as seen from the direction in which the displacement part 31 is displaced. Thereby, the area of the displacement part 31 may be secured to be larger and the space between the support 6 and the piezoelectric vibrator 5 may be suppressed (made smaller).

The column members 61, 62 respectively have elongated shapes and extend in the Z-axis direction. Further, the lower ends of the column members 61, 62 in the longitudinal direction (Z-axis direction) are respectively joined to the projection part 22 of the holding member 2.

The column members 61, 62 are provided in parallel to each other. Further, the column members 61, 62 are provided apart from each other in the X-axis direction.

Furthermore, the column members 61, 62 respectively have plate shapes and are provided with the plate surfaces in parallel to the XZ plane.

In addition, the column members 61, 62 are formed so that their lengths in the Z-axis direction may be equal to each other. Thereby, by using the same constituent material for the column members 61, 62, the lengths of the column members 61, 62 in the Z-axis direction when they thermally expand or thermally contract may be equal to each other.

Further, the column members 61, 62 are formed so that their lengths in the Z-axis direction may be equal to that of the above described piezoelectric vibrator 5.

As the constituent material of the column members 61, 62, not particularly limited, but a material with a coefficient of thermal expansion equal to or close to that of the piezoelectric material forming the piezoelectric element of the above described piezoelectric vibrator 5 is preferably used. Thereby, the thermal strain of the piezoelectric vibrator 5 may be prevented or suppressed.

From the point of view, specifically, it is preferable to use the same piezoelectric material as the piezoelectric material used for the piezoelectric vibrator 5 for the constituent material of the column members 61, 62.

Note that the lengths of the column members 61, 62 in the Z-axis direction may be different from the length of the piezoelectric vibrator 5 in the Z-axis direction. In this case, the constituent material of the column members 61, 62 may be selected so that the amount of thermal expansion of the column members 61, 62 in the Z-axis direction may be equal to the amount of thermal expansion of the piezoelectric vibrator 5 in the Z-axis direction.

To the column members 61, 62, the beam member 63 is joined to connect them.

The beam member 63 extends in the X-axis direction. Further, the beam member 63 has one end (on the left in FIG. 3) in its longitudinal direction (X-axis direction) joined to the upper end part of the column member 61 and the other end (on the right in FIG. 3) to the upper end part of the column member 62.

Further, the base part 52 of the piezoelectric vibrator 5 is joined to the part of the beam member 63 in the middle in the longitudinal direction.

Furthermore, the beam member 63 has a plate shape and is provided with the plate surface in parallel to the XZ plane.

The beam member 63 is formed using a different material from that of the above described column members 61, 62, and thereby, the column members 61, 62 and the beam member 63 may be respectively formed using materials with desired coefficients of thermal expansion.

As the constituent material of the beam member 63, not particularly limited, but a material with a coefficient of thermal expansion equal to or close to that of the above described holding member 2 or diaphragm 3 is preferably used. Thereby, the thermal strain of the piezoelectric vibrator 5 may be prevented or suppressed.

From the point of view, specifically, it is preferable to use the same material as the constituent material of the holding member 2 or diaphragm 3 for the constituent material of the beam member 63.

In the pressure sensor 1 having the above explained configuration, when the external pressure on the displacement part 31 of the diaphragm 3 is higher than the pressure within the housing 11, the displacement part 31 is displaced toward inside of the housing 11. On the other hand, when the external pressure on the displacement part 31 of the diaphragm 3 is lower than the pressure within the housing 11, the displacement part 31 is displaced toward outside of the housing 11.

When the displacement part 31 is displaced toward inside of the housing 11, the piezoelectric vibrator 5 is subjected to the compressive stress in the Z-axis direction. On the other hand, when the displacement part 31 is displaced toward outside of the housing 11, the piezoelectric vibrator 5 is subjected to the tensile stress in the Z-axis direction.

The piezoelectric vibrator 5 is subjected to the compressive stress or the tensile stress in the Z-axis direction, and thereby, the resonance frequency of the piezoelectric vibrator 5 changes.

Then, the circuit unit 13 detects the pressure on the diaphragm 3 based on the resonance frequency of the piezoelectric vibrator 5.

Here, according to the pressure sensor 1, the support 6 is fixed to the holding member 2, and thereby, the unintended deformation or displacement of the support 6 may be prevented or suppressed compared to the case where the support 6 is fixed to the diaphragm 3.

Specifically, since the support 6 is fixed to the projection part 22 provided at the inner side than the fixing part 21 of the holding member 2, the space between the support 6 and the piezoelectric vibrator 5 may be made smaller. As a result, the stiffness of the support 6 may be improved, and the unintended deformation or displacement of the support 6 may be effectively prevented or suppressed.

Further, since the end of the support 6 at the opposite side to the holding member 2 may be downsized, also, the deformation of the support 6 due to acceleration may be prevented or suppressed.

Furthermore, since the holding member 2 has the projection part 22, the stiffness of the holding member 2 may be improved. Accordingly, the unintended deformation of the diaphragm 3 and the support 6 due to deformation of the holding member 2 may be prevented.

According to the configuration, the pressure sensor 1 may exert the advantageous sensing accuracy.

Manufacture of Pressure Sensor

Next, a manufacturing method of the pressure-sensitive unit 12 of the above described pressure sensor 1 will be explained.

Figure 4A:
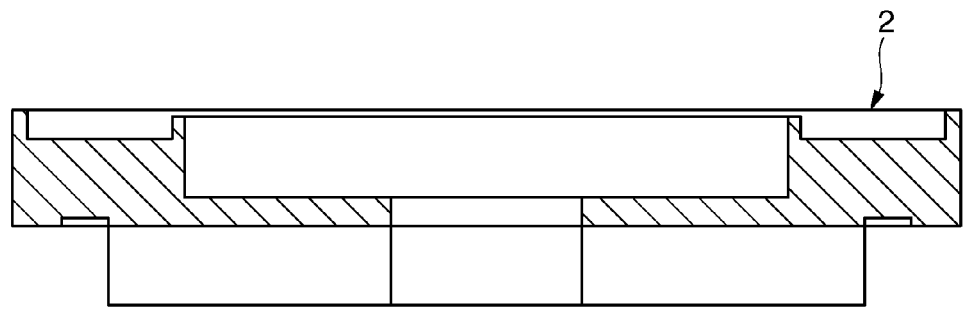
FIGS. 4A to 4C are diagrams for explanation of a providing step of a diaphragm (pressure receiving unit) in a manufacturing method of the pressure-sensitive unit (a manufacturing method of the pressure sensor) shown in FIG. 2.
Figure 4B:
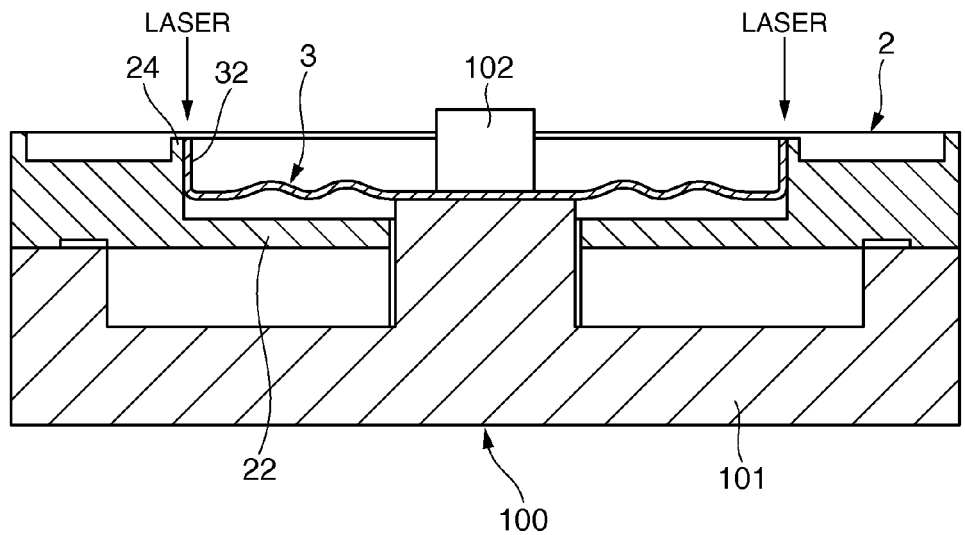
Figure 4C:
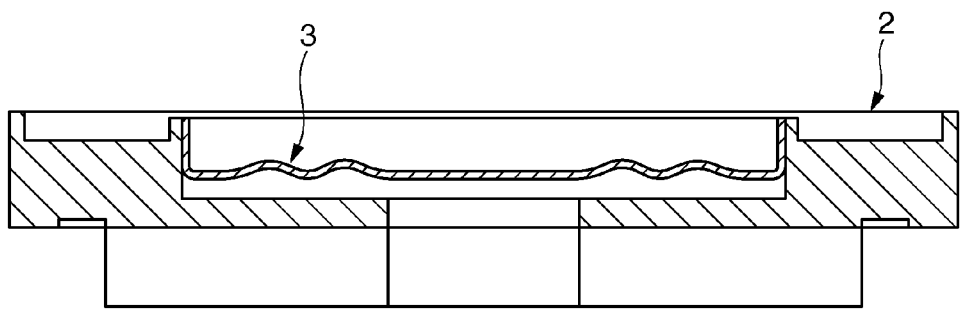
Figure 5A:
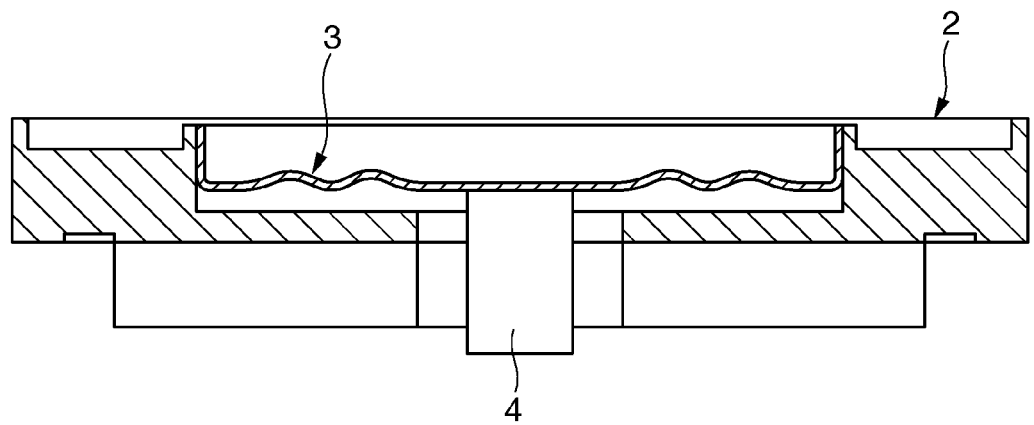
FIGS. 5A and 5B are diagrams for explanation of a providing step of a piezoelectric vibrator and column members in the manufacturing method of the pressure-sensitive unit (the manufacturing method of the pressure sensor) shown in FIG. 2.
Figure 5B:
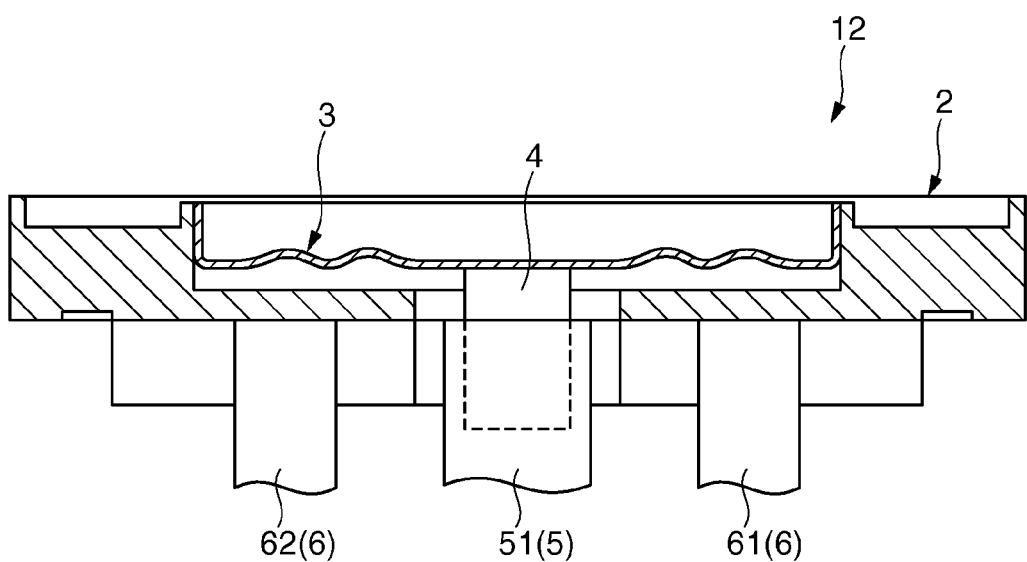

FIGS. 4A to 4C are diagrams for explanation of a providing step of the diaphragm in the manufacturing method of the pressure-sensitive unit (the manufacturing method of the pressure sensor) shown in FIG. 2, and FIGS. 5A and 5B are diagrams for explanation of a providing step of the piezoelectric vibrator and the column members in the manufacturing method of the pressure-sensitive unit (the manufacturing method of the pressure sensor) shown in FIG. 2.

The manufacturing method of the pressure-sensitive unit 12 has step [A] of joining the diaphragm 3 to the holding member 2, step [B] of joining the fixing member 4 to the diaphragm 3, and step [C] of joining the piezoelectric vibrator 5 to the fixing member 4 and joining the column members 61, 62 to the holding member 2.

As below, the respective steps will be sequentially explained.

[A]

First, as shown in FIG. 4A, the holding member 2 is prepared.

Then, as shown in FIG. 4B, the diaphragm 3 is joined to the holding member 2 by welding.

In this regard, the diaphragm 3 is held using a jig 100 so that the end surface (lower end surface) of the outer circumferential part 32 of the diaphragm 3 and the tip surface of the protrusion 24 of the holding member 2 may be on the same plane (the same XY plane).

The jig 100 includes a base 101 and a pressing member 102.

The base 101 is formed using a magnetic material such as SUS, for example. Then, the holding member 2 is placed on the base 101. In this regard, the base 101 is in contact with the holding member 2 from the opposite side to the protrusion 24 (the lower side in FIG. 4B) and in contact with the diaphragm 3 via the opening part 23 of the holding member 2. Thereby, the movement of the diaphragm 3 toward the projection part 22 of the holding member 2 (the lower side in FIG. 4B) may be restricted.

Further, the pressing member 102 is a magnet such as a neodymium magnet. Then, the pressing member 102 is placed on the diaphragm 3. In this regard, the pressing member 102 is attracted to the base 101 via the diaphragm 3 by magnetic force. Thereby, the movement of the diaphragm 3 toward the opposite side to the projection part 22 of the holding member 2 (the upper side in FIG. 4B) may be restricted.

The diaphragm 3 is secured from both sides by the base 101 and the pressing member 102, and thereby, the end surface of the outer circumferential part 32 of the diaphragm 3 and the tip surface of the protrusion 24 of the holding member 2 may be held on the same plane.

Note that, in the embodiment, the case where the pressing member 102 is a magnet has been explained as an example, however, the pressing member 102 may be adapted for pressing toward the base 101 by hand or an actuator or the like. In this case, the pressing member 102 may not be the magnet, but may be formed using a metal material, a resin material, a ceramic material, or the like, for example. Further, in this case, the base 101 may not be formed using the magnetic material, but may be formed using a metal material other than the magnetic material, a resin material, a ceramic material, or the like, for example.

Then, under the condition, the outer circumferential part 32 of the diaphragm 3 and the protrusion 24 of the holding member 2 are joined by welding.

In this regard, the protrusion 24 is formed to be thinner, and the diaphragm 3 and the holding member 2 may be welded with a relatively small amount of heat. Accordingly, deformation due to heat at welding and generation of residual stress of the diaphragm 3 may be prevented or suppressed. As a result, the detection sensitivity and the detection accuracy of the pressure sensor 1 may be made better.

As the joining method, laser welding is preferably used and, specifically, welding with fiber laser is preferably used. Note that, the joining method is not limited to the laser welding, but, for example, other welding methods such as arc welding, bonding using an adhesive, brazing, or the like may be used.

After the welding is ended, the jig 100 is detached, and a joined body in which the holding member 2 and the diaphragm 3 are joined as shown in FIG. 4C is obtained.

[B]

Then, as shown in FIG. 5A, the fixing member 4 is joined to the diaphragm 3.

The joining method is not particularly limited, but bonding using an adhesive, welding such as laser welding or arc welding, brazing, or the like may be used, and particularly, bonding using low-melting-point glass as an adhesive is preferably used. The low-melting-point glass has low viscoelasticity. Accordingly, the pressure hysteresis generated in the diaphragm 3 may be suppressed or prevented. Further, the low-melting-point glass can be cured at a relatively low temperature, and thus, extra stress generated in the holding member 2, the diaphragm 3, or the like may be prevented or suppressed.

[C]

Then, as shown in FIG. 5B, the piezoelectric vibrator 5 is joined to the fixing member 4 and the column members 61, 62 are joined to the holding member 2.

The joining methods are not particularly limited, but bonding using an adhesive, welding such as laser welding or arc welding, brazing, or the like may be used. However, bonding methods that do not adversely affect the joint (bonding) between the diaphragm 3 and the fixing member 4 are preferably used, and bonding using an adhesive, specifically, bonding using a resin adhesive is preferably used. The resin adhesive is hard to cause breakdown phenomenon such as cracking or fracture. Accordingly, the durability of the pressure sensor 1 may be improved. Further, the resin adhesive can be cured at a relatively low temperature, and thus, extra stress generated in the piezoelectric vibrator 5, the holding member 2, the diaphragm 3, or the like may be prevented or suppressed.

Then, after the joining, the beam member 63 is joined to the piezoelectric vibrator 5 and the column members 61, 62.

As the joining method, the same method as the above described joining of the fixing member 4 and the piezoelectric vibrator 5 and joining of the holding member 2 and the column members 61, 62 may be used.

Note that the beam member 63 may be joined to the piezoelectric vibrator 5 and the column members 61, 62 before the above described joining of the fixing member 4 and the piezoelectric vibrator 5 and joining of the holding member 2 and the column members 61, 62.

According to the above explained manufacturing method of the pressure sensor 1, the thinner protrusion 24 is provided in the joint part of the holding member 2 and the diaphragm 3, and thus, the holding member 2 and the diaphragm 3 may be joined by welding with a relatively small amount of heat in a short time. Accordingly, the residual stress generated in the diaphragm 3 after joined to the holding member 2 may be reduced. As a result, the detection accuracy and the detection sensitivity of the pressure sensor 1 may be made better.

Second Embodiment

Next, the second embodiment of the invention will be explained.

Figure 6:
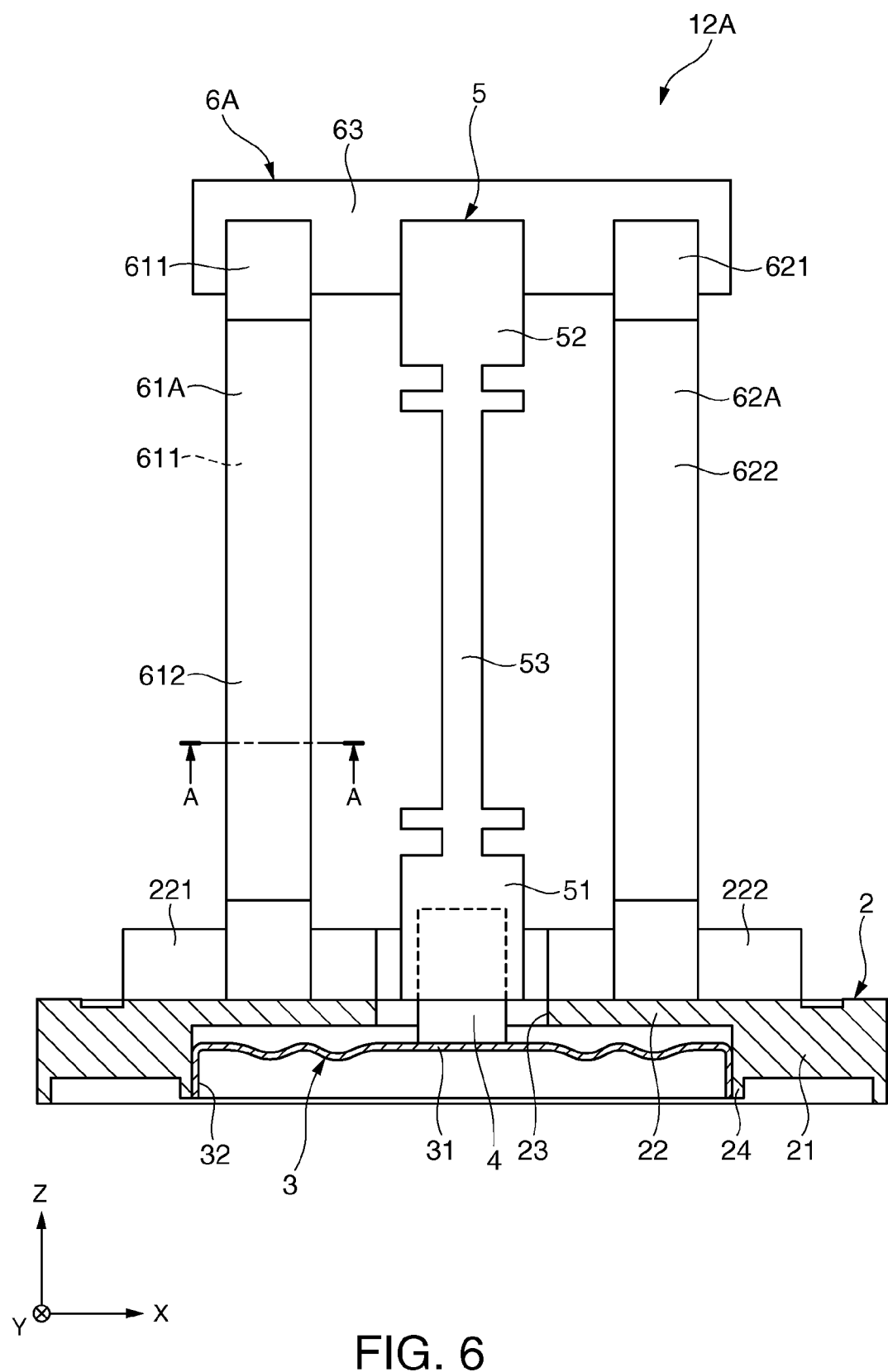
FIG. 6 is a side view of a pressure-sensitive unit in a physical quantity detector (pressure sensor) according to a second embodiment of the invention.
Figure 7A:
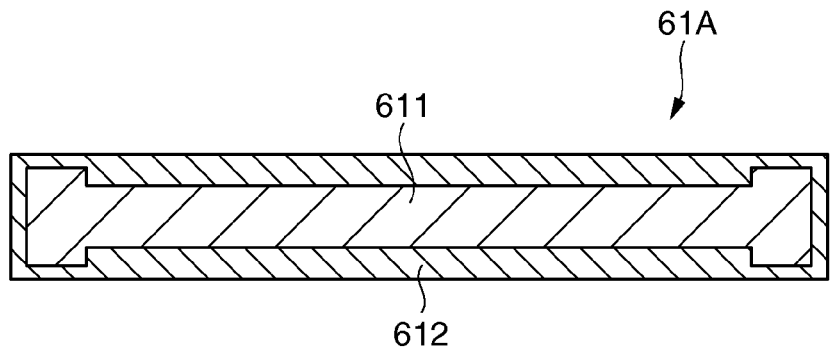
FIG. 7A is a cross-sectional view of a column member of the pressure-sensitive unit shown in FIG. 6 (a sectional view along A-A line in FIG. 6)
Figure 7B:
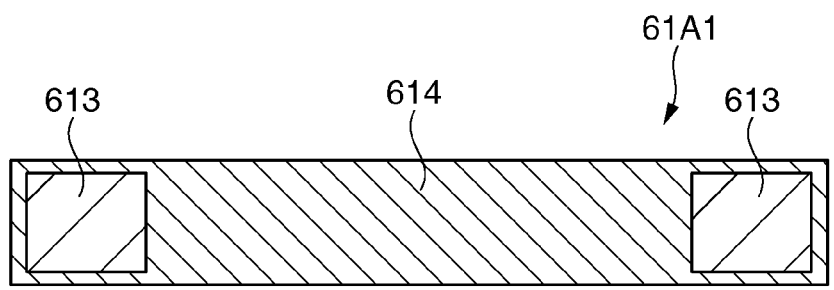
FIG. 7B is a cross-sectional view of a first modified example of the column member of the pressure-sensitive unit shown in FIG. 6.
Figure 7C:
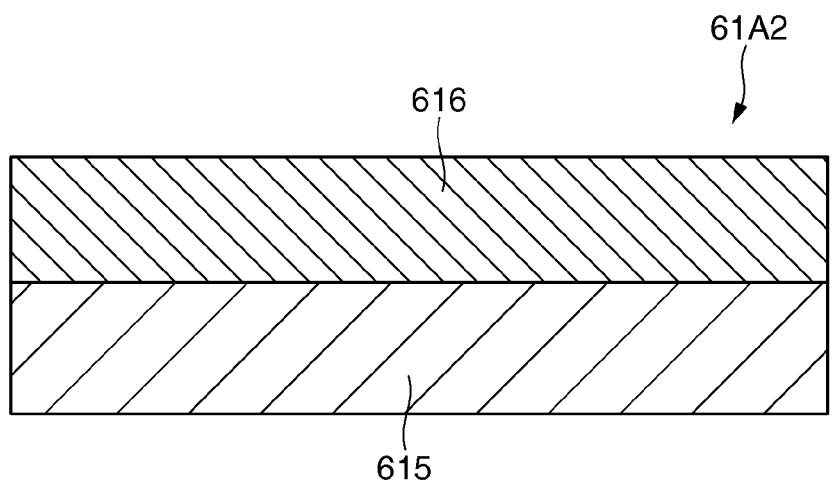
FIG. 7C is a cross-sectional view of a second modified example of the column member of the pressure-sensitive unit shown in FIG. 6.

FIG. 6 is a side view of a pressure-sensitive unit in a physical quantity detector (pressure sensor) according to the second embodiment of the invention, FIG. 7A is a cross-sectional view of a column member of the pressure-sensitive unit shown in FIG. 6 (a sectional view along A-A line in FIG. 6), FIG. 7B is a cross-sectional view of a first modified example of the column member of the pressure-sensitive unit shown in FIG. 6, and FIG. 7C is a cross-sectional view of a second modified example of the column member of the pressure-sensitive unit shown in FIG. 6.

As below, the physical quantity detector (pressure sensor) of the second embodiment will be explained with an emphasis on the difference from the above described embodiment, and the explanation of the same matters will be omitted.

The physical quantity detector (pressure sensor) of the second embodiment of the invention is the same as the above described first embodiment except that the configuration of the support of the pressure-sensitive unit is different. Note that FIGS. 6 and 7A to 7C have the same signs for the same configurations as those of the above described first embodiment.

A pressure-sensitive unit 12A provided in the physical quantity detector (pressure sensor) of the embodiment includes a support 6A connecting the base part 52 of the piezoelectric vibrator 5 and the holding member 2 as shown in FIG. 6.

The support 6A has a column member 61A joined to the surface 221 of the holding member 2, a column member 62A joined to the surface 222 of the holding member 2, and the beam member 63 connecting the column members 61A, 62A and the base part 52 of the piezoelectric vibrator 5.

The column member 61A has an elongated main body part 611 and a buffer part 612 connected to the outer circumferential surface of the main body part 611.

Similarly, the column member 62A has an elongated main body part 621 and a buffer part 622 connected to the outer circumferential surface of the main body part 621.

Here, the buffer parts 612, 622 have lower Q-values than the Q-value of the piezoelectric vibrator 5. Accordingly, the resonance of the vibration of the piezoelectric vibrator 5 and the vibration of the support 6A may be suppressed.

As below, the column member 61A will be explained with reference to FIGS. 7A to 7C. Note that the column member 62A is the same as the column member 61A, and its explanation will be omitted.

As shown in FIG. 7A, the buffer part 612 is joined over the entire circumference of the outer circumferential surface of the main body part 611 in the cross-sectional surface of the column member 61A.

Further, in the cross-sectional surface, recess parts are formed on both plate surfaces in the main body part 611. Thereby, the contact area between the main body part 611 and the buffer part 612 may be increased. As a result, the joint strength between the main body part 611 and the buffer part 612 may be improved. Furthermore, the buffer part 612 may be formed to enter the recess part. Accordingly, by increasing the volume of the buffer part 612, the effect by providing the buffer part 612 may be increased.

The buffer part 612 produces the damping effect of damping the vibration of the main body part 611.

By providing the buffer part 612, the vibration of the column member 61A with the vibration of the piezoelectric vibrator 5 may be suppressed. Accordingly, the vibration of the support 6A may be suppressed and the vibration of the support 6A may be prevented from adversely affecting the vibration of the piezoelectric vibrator 5. As a result, reduction in detection accuracy of the pressure sensor may be prevented.

The constituent material of the buffer part 612 is not particularly limited, but any material providing the Q-value of the buffer part 612 lower than the Q-value of the piezoelectric vibrator 5 may be used, and a potting gel such as a silicon resin may be used, for example.

As below, the modified examples of the column member 61A will be explained.

MODIFIED EXAMPLE 1

A column member 61A1 according to modified example 1 shown in FIG. 7B has an elongated main body part 613 and a buffer part 614 connected to the outer circumferential surface of the main body part 613.

In the column member 61A1, in the cross-sectional surface, a through hole penetrating in the thickness direction is formed in the main body part 613. In other words, the main body part 613 includes two rod-like members branched in the middle in the longitudinal direction.

Thereby, the buffer part 614 may be formed to enter the through hole. Accordingly, the volume of the buffer part 614 may be increased and the effect by providing the buffer part 614 may be increased.

MODIFIED EXAMPLE 2

A column member 61A2 according to modified example 2 shown in FIG. 7C has an elongated main body part 615 and a buffer part 616 connected to the outer circumferential surface of the main body part 615.

In the column member 61A2, in the cross-sectional surface, the main body part 615 has a flat plate shape. Further, the buffer part 616 is stacked on one surface of the main body part 615. In the column member 61A2 having the multilayered structure, the buffer part 616 may be easily formed with high accuracy using various kinds of deposition on the one surface of the main body part 615.

According to the above described physical quantity detector (pressure sensor) of the second embodiment, the detection accuracy may also be made better.

Third Embodiment

Next, the third embodiment of the invention will be explained.

Figure 8:
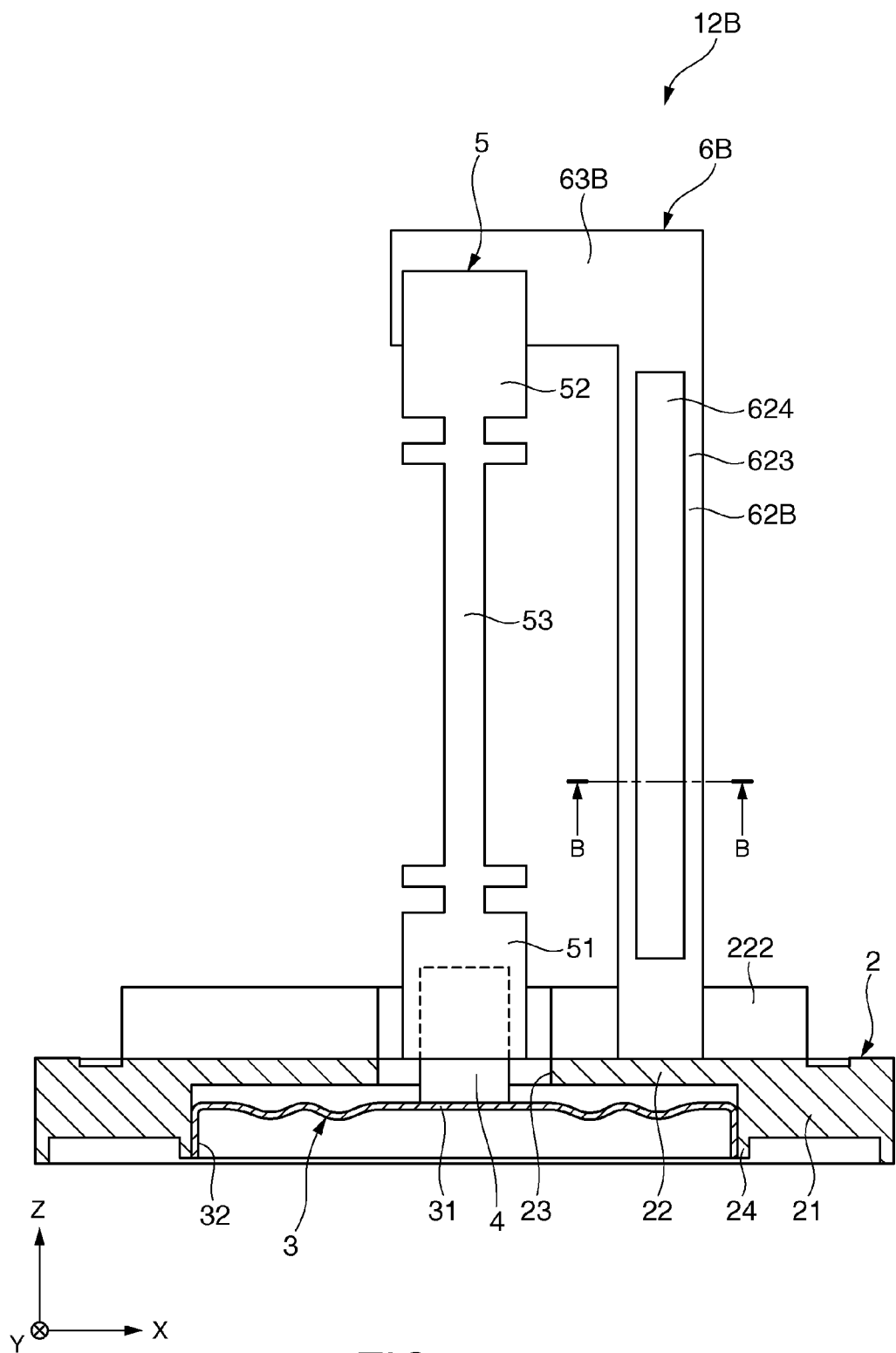
FIG. 8 is a side view of a pressure-sensitive unit in a physical quantity detector (pressure sensor) according to a third embodiment of the invention.
Figure 9A:
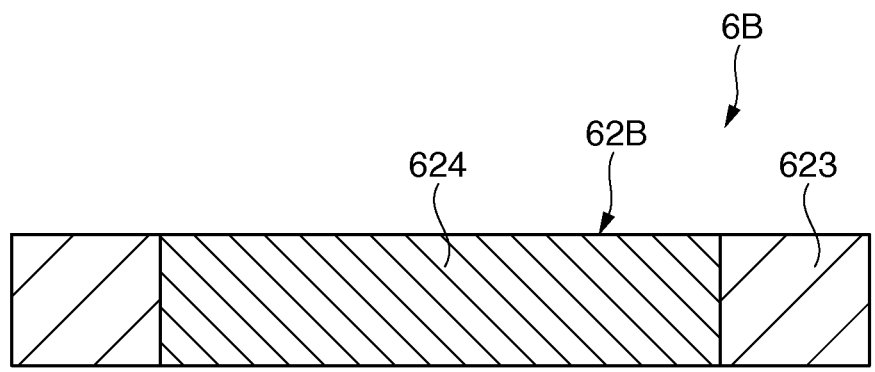
FIG. 9A is a cross-sectional view of a column member of the pressure-sensitive unit shown in FIG. 8 (a sectional view along B-B line in FIG. 8)
Figure 9B:
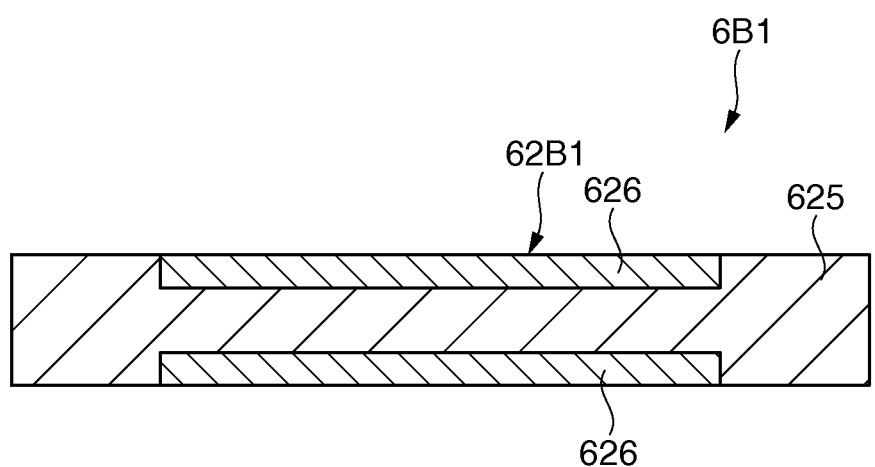
FIG. 9B is a cross-sectional view of a modified example of the column member of the pressure-sensitive unit shown in FIG. 8.

FIG. 8 is a side view of a pressure-sensitive unit in a physical quantity detector (pressure sensor) according to the third embodiment of the invention, FIG. 9A is a cross-sectional view of a column member of the pressure-sensitive unit shown in FIG. 8 (a sectional view along B-B line in FIG. 8), and FIG. 9B is a cross-sectional view of a modified example of the column member of the pressure-sensitive unit shown in FIG. 8.

As below, the physical quantity detector (pressure sensor) of the third embodiment will be explained with an emphasis on the difference from the above described embodiments, and the explanation of the same matters will be omitted.

The physical quantity detector (pressure sensor) of the third embodiment of the invention is the same as the above described first embodiment except that the configuration of the support of the pressure-sensitive unit is different. Note that FIGS. 8 and 9A and 9B have the same signs for the same configurations as those of the above described first embodiment.

A pressure-sensitive unit 12B provided in the physical quantity detector (pressure sensor) of the embodiment includes a support 6B connecting the base part 52 of the piezoelectric vibrator 5 and the holding member 2 as shown in FIG. 8.

The support 6B has a column member 62B joined to the surface 222 of the holding member 2 and a beam member 63B connecting the column member 62B and the base part 52 of the piezoelectric vibrator 5.

The column member 62B has a first part 623, and a second part 624 joined to the first part 623.

Here, the first part 623 and the second part 624 are formed using different materials from each other, specifically, different materials in coefficient of thermal expansion. Accordingly, by appropriately selecting a combination of the constituent materials of the first part 623 and the second part 624, the coefficient of thermal expansion of the whole column member 62B in the Z-axis direction may be adjusted. Therefore, the coefficients of thermal expansion of the column member 62B and the piezoelectric vibrator 5 in the Z-axis direction may be made equal to each other relatively easily.

More specifically, as shown in FIGS. 9A and 9B, in the cross-sectional surface, the first part 623 has a through hole penetrating in the thickness direction.

Further, in the embodiment, the first part 623 is integrally formed with the beam member 63B.

Furthermore, the second part 624 is formed to fit or fill in the through hole of the first part 623.

In the column member 62B, as the constituent material of the first part 623, a material equal to or close to the constituent material of the diaphragm 3 or the holding member 2 is preferably used. Thereby, the constituent material of the beam member 63B may be the same as the constituent material of the diaphragm 3 or the holding member 2.

Further, regarding the constituent material of the second part 624, when the coefficient of thermal expansion of the first part 623 is larger than the coefficient of thermal expansion of the piezoelectric vibrator 5, a material with a coefficient of thermal expansion smaller than that of the piezoelectric vibrator 5 is preferably used. On the other hand, when the coefficient of thermal expansion of the first part 623 is smaller than the coefficient of thermal expansion of the piezoelectric vibrator 5, a material with a coefficient of thermal expansion larger than that of the piezoelectric vibrator 5 is preferably used. Thereby, the difference in coefficient of thermal expansion between the column member 62B and the piezoelectric vibrator 5 in the Z-axis direction may be reduced.

As below, a modified example of the column member 62B will be explained.

MODIFIED EXAMPLE

A column member 62B1 according to the modified example shown in FIG. 9B has a first part 625 and a second part 626 joined to the first part 625.

In the column member 62B1, in the cross-sectional surface, recess parts are formed on both plate surfaces in the first part 625.

Further, the second part 626 is formed to fit or fill in the through hole.

According to the above described physical quantity detector (pressure sensor) of the third embodiment, the detection accuracy may also be made better.

Fourth Embodiment

Next, the fourth embodiment of the invention will be explained.

Figure 10:
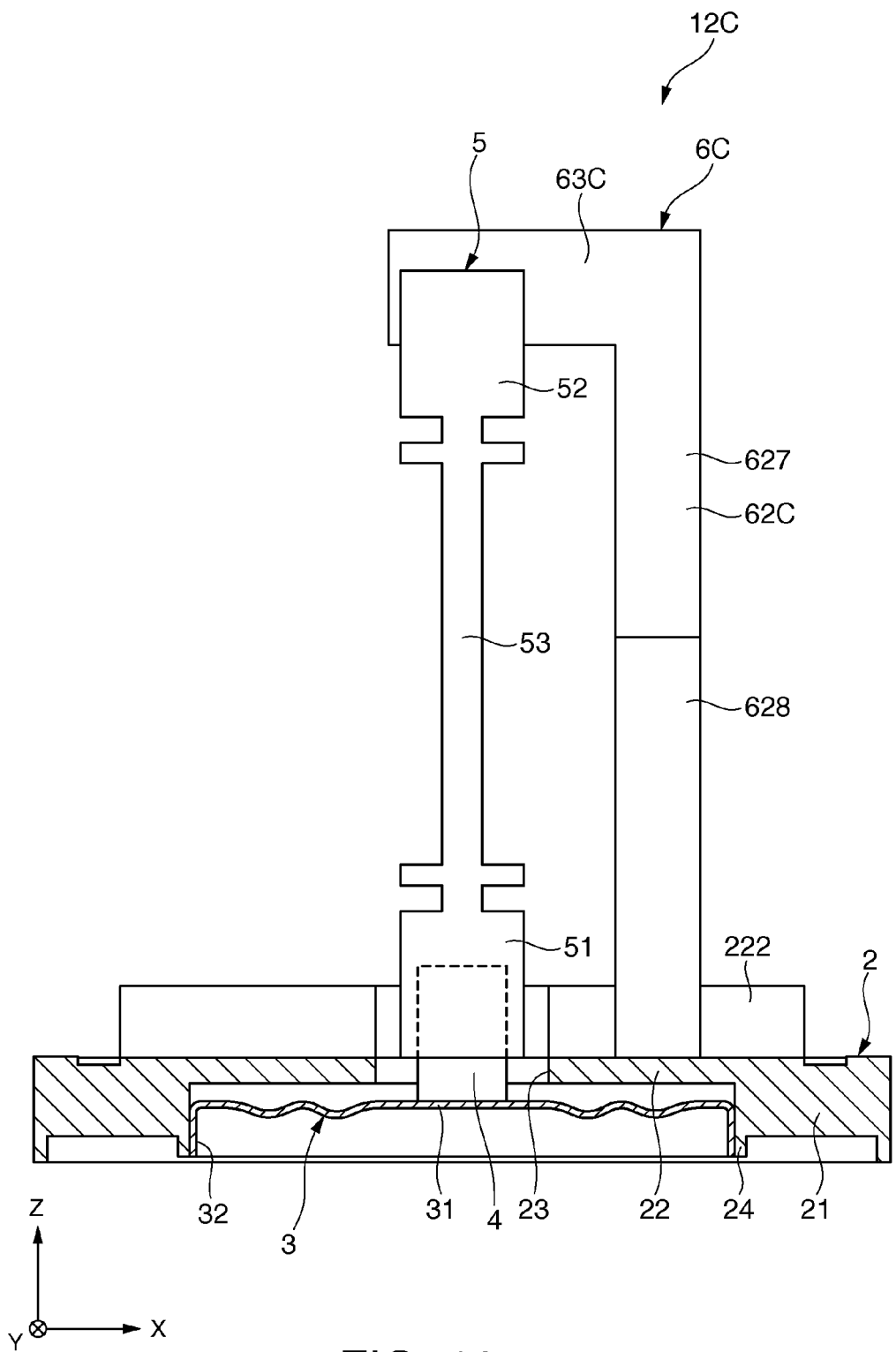
FIG. 10 is a side view of a pressure-sensitive unit in a physical quantity detector (pressure sensor) according to a fourth embodiment of the invention.

FIG. 10 is a side view of a pressure-sensitive unit in a physical quantity detector (pressure sensor) according to the fourth embodiment of the invention.

As below, the physical quantity detector (pressure sensor) of the fourth embodiment will be explained with an emphasis on the difference from the above described embodiments, and the explanation of the same matters will be omitted.

The physical quantity detector (pressure sensor) of the fourth embodiment of the invention is the same as the above described first embodiment except that the configuration of the support of the pressure-sensitive unit is different. Note that FIG. 10 has the same signs for the same configurations as those of the above described first embodiment.

A pressure-sensitive unit 12C provided in the physical quantity detector (pressure sensor) of the embodiment includes a support 6C connecting the base part 52 of the piezoelectric vibrator 5 and the holding member 2 as shown in FIG. 10.

The support 6C has a column member 62C joined to the surface 222 of the holding member 2 and a beam member 63C connecting the column member 62C and the base part 52 of the piezoelectric vibrator 5.

The column member 62C has a first part 627, and a second part 628 joined to the first part 627.

Here, the first part 627 is the upper part of the column member 62C and the second part 628 is the lower part of the column member 62C. Further, the first part 627 and the second part 628 are formed using different materials from each other, specifically, materials having different coefficients of thermal expansion from each other. The combination of the constituent materials of the first part 627 and the second part 628 are appropriately selected, and thereby, the coefficient of thermal expansion of the whole column member 62C in the Z-axis direction may be adjusted. Accordingly, regardless of the shape and the size of the column member 62C, the coefficients of thermal expansion of the column member 62C and the piezoelectric vibrator 5 in the Z-axis direction may be made equal to each other relatively easily.

Further, in the embodiment, the first part 627 is integrally formed with the beam member 63C.

In the column member 62C, as the constituent material of the first part 627, a material equal to or close to the constituent material of the diaphragm 3 or the holding member 2 is preferably used. Thereby, the constituent material of the beam member 63C may be made the same material as the constituent material of the diaphragm 3 or the holding member 2.

Further, as the constituent material of the second part 628, when the coefficient of thermal expansion of the first part 627 is larger than the coefficient of thermal expansion of the piezoelectric vibrator 5, a material with a coefficient of thermal expansion smaller than that of the piezoelectric vibrator 5 is preferably used. On the other hand, when the coefficient of thermal expansion of the first part 627 is smaller than the coefficient of thermal expansion of the piezoelectric vibrator 5, a material with a coefficient of thermal expansion larger than that of the piezoelectric vibrator 5 is preferably used. Thereby, the difference in coefficient of thermal expansion between the column member 62C and the piezoelectric vibrator 5 in the Z-axis direction may be reduced.

According to the above described physical quantity detector (pressure sensor) of the fourth embodiment, the detection accuracy may also be made better.

Fifth Embodiment

Next, the fifth embodiment of the invention will be explained.

Figure 11:
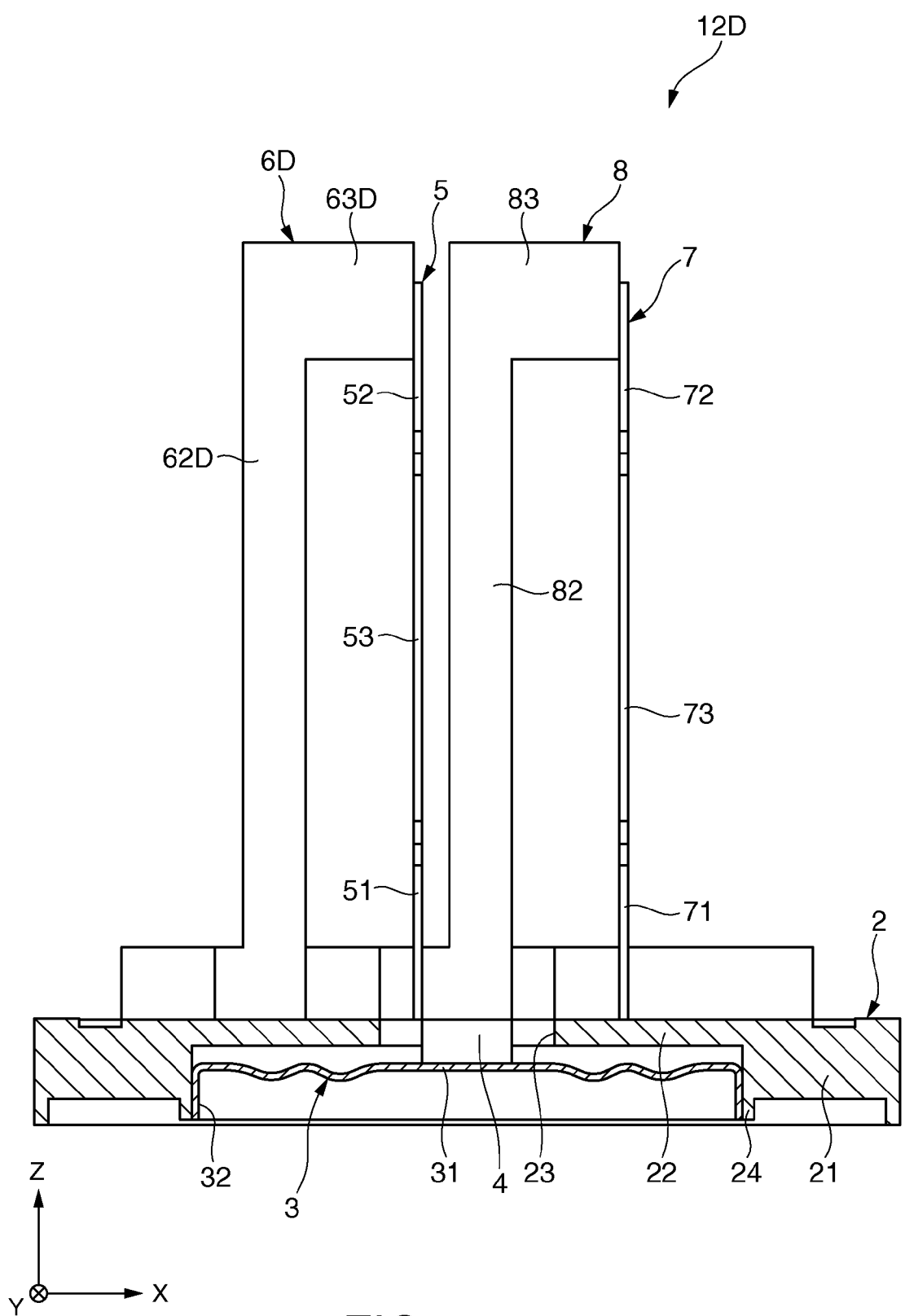
FIG. 11 is a side view of a pressure-sensitive unit in a physical quantity detector (pressure sensor) according to a fifth embodiment of the invention.

FIG. 11 is a side view of a pressure-sensitive unit in a physical quantity detector (pressure sensor) according to the fifth embodiment of the invention.

As below, the physical quantity detector (pressure sensor) of the fifth embodiment will be explained with an emphasis on the difference from the above described embodiments, and the explanation of the same matters will be omitted.

The physical quantity detector (pressure sensor) of the fifth embodiment of the invention is the same as the above described first embodiment except that the configuration and the number of the support of the pressure-sensitive unit and the number and the arrangement of the piezoelectric vibrators are different. Note that FIG. 11 has the same signs for the same configurations as those of the above described first embodiment.

A pressure-sensitive unit 12D provided in the physical quantity detector (pressure sensor) of the embodiment includes a support 6D connecting the base part 52 of the piezoelectric vibrator 5 and the holding member 2 as shown in FIG. 11.

Further, the pressure-sensitive unit 12D includes a piezoelectric vibrator 7 and a support 8 in addition to the piezoelectric vibrator 5 and the support 6D.

Note that, in FIG. 11, the piezoelectric vibrators 5, 7 are respectively provided so that their principal surfaces may be orthogonal to the X-axis direction.

The support 6D has a column member 62D joined to the projection part 22 of the holding member 2 and a beam member 63D connecting the column member 62D and the base part 52 of the piezoelectric vibrator 5.

In the embodiment, the column member 62D and the beam member 63D are integrally formed.

The piezoelectric vibrator 7 is formed like the piezoelectric vibrator 5. Specifically, the piezoelectric vibrator 7 has a pair of base parts 71, 72 provided apart from each other, and a vibrating part 73 (vibration beam) provided between the pair of base parts 71, 72 and excited into vibration.

The base parts 71, 72 are provided in line in the Z-axis direction.

The base part 71 is joined (fixed) to the projection part 22 of the holding member 2. On the other hand, the base part 72 is joined (fixed) to a beam member 83 of the support 8, which will be described later.

The base part 71 and the base part 72 are connected via the vibrating part 73.

The vibrating part 73 has an elongated shape and extends along the Z-axis direction.

The support 8 has a column member 82 joined (fixed) to the surface 41 of the fixing member 4, and the beam member 83 connecting the column member 82 and the base part 72 of the piezoelectric vibrator 7.

In the embodiment, the column member 62D and the beam member 63D are integrally formed like the above described column member 62D and beam member 63D.

In the pressure sensor having the configuration, when the displacement part 31 is displaced toward inside of the housing 11, the piezoelectric vibrator 5 is subjected to the compressive stress in the Z-axis direction and the piezoelectric vibrator 7 is subjected to the tensile stress in the Z-axis direction. On the other hand, when the displacement part 31 is displaced toward outside of the housing 11, the piezoelectric vibrator 5 is subjected to the tensile stress in the Z-axis direction and the piezoelectric vibrator is subjected to the compressive stress in the Z-axis direction.

Therefore, the received pressure on the diaphragm 3 may be detected based on the difference between the resonance frequency of the piezoelectric vibrator 5 and the resonance frequency of the piezoelectric vibrator 7. In the difference, the characteristics such as the temperature characteristics and the aging characteristics of the piezoelectric vibrators 5, 7 are cancelled out. Accordingly, the high-accuracy pressure measurement may be performed.

According to the above described physical quantity detector (pressure sensor) of the fifth embodiment, the detection accuracy may also be made better.

Sixth Embodiment

Next, the sixth embodiment of the invention will be explained.

Figure 12:
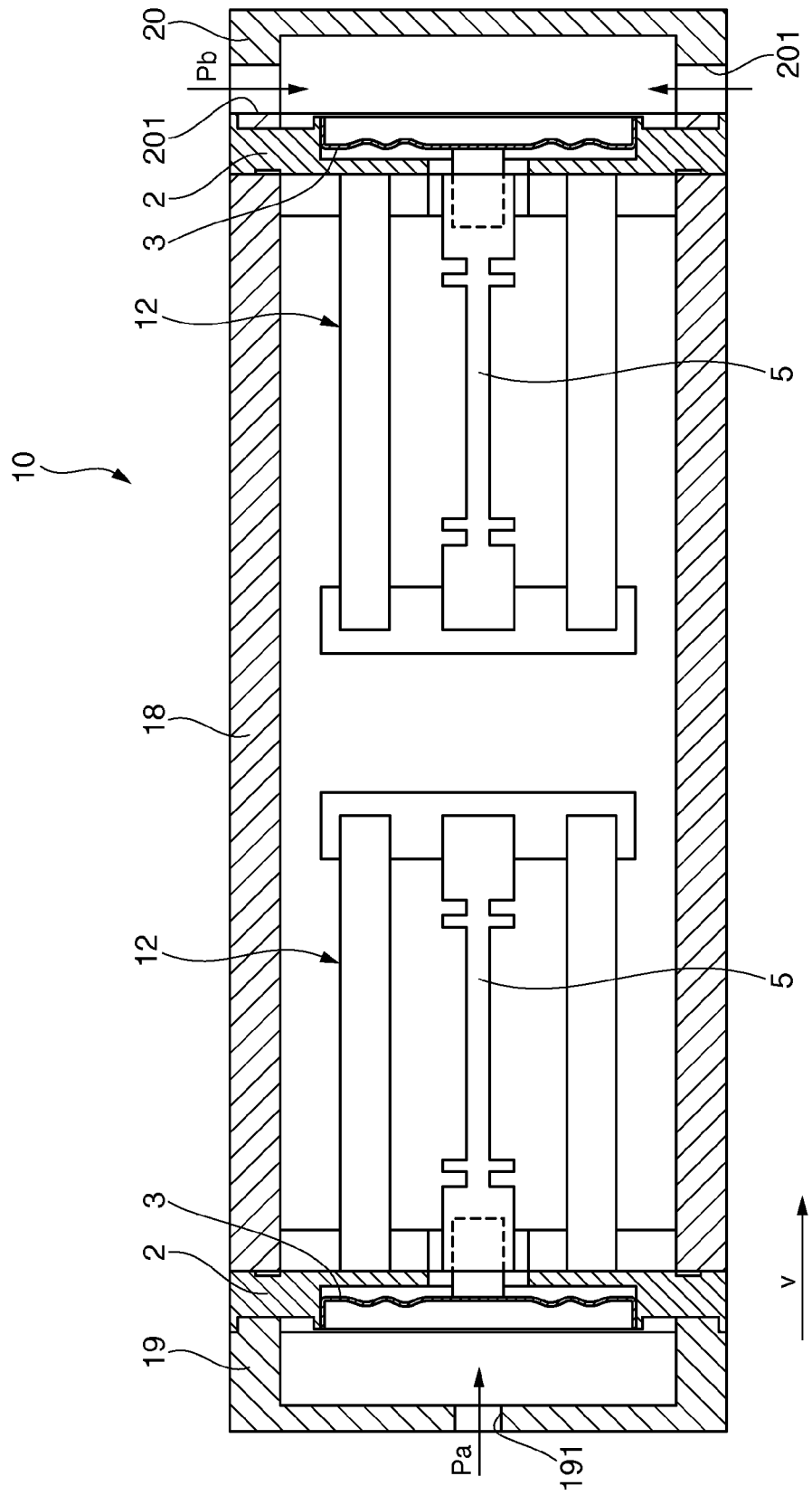
FIG. 12 shows a physical quantity detector (flow rate sensor) according to a sixth embodiment of the invention.

FIG. 12 shows a pressure-sensitive unit in a physical quantity detector (flow rate sensor) according to the sixth embodiment of the invention.

As below, the physical quantity detector (pressure sensor) of the sixth embodiment will be explained with an emphasis on the difference from the above described embodiments, and the explanation of the same matters will be omitted.

The physical quantity detector (pressure sensor) according to the sixth embodiment of the invention is a flow rate sensor formed using the pressure-sensitive unit of the physical quantity detector (pressure sensor) of the above described first embodiment.

Note that FIG. 12 has the same signs for the same configurations as those of the above described first embodiment.

A flow rate sensor 10 (physical quantity detector (pressure sensor)) shown in FIG. 12 detects a flow rate. The flow rate sensor 10 includes a housing 18, two pressure-sensitive units 12, and caps 19, 20 as shown in FIG. 12. Note that, though illustration is omitted in FIG. 12, the flow rate sensor 10 has a circuit unit, a cable, etc. like the pressure sensor 1 of the above described first embodiment.

The housing 18 has a cylindrical shape.

Within the housing 18, the two pressure-sensitive units 12 are provided.

Further, the holding member 2 and the diaphragm 3 of one pressure-sensitive unit 12 (on the left in FIG. 12) seal the opening of one end (the left end in FIG. 12) of the housing 18. On the other hand, the holding member 2 and the diaphragm 3 of the other pressure-sensitive unit 12 (on the right in FIG. 12) seal the opening of the other end (the right end in FIG. 12) of the housing 18.

Furthermore, the cap 19 is attached to the one end of the housing 18, and the cap 20 is attached to the other end of the housing 18.

In the cap 19, a communication hole 191 through which a fluid can communicate in a direction in parallel to the axial line (center axis) of the housing 18 is formed. Thereby, the pressure of the fluid flowing into the cap 19 via the communication hole 191 is applied to the diaphragm 3 of the other pressure-sensitive unit 12 (on the left in FIG. 12).

In the cap 20, a communication hole 201 through which a fluid can communicate in a direction perpendicular to the axial line (center axis) of the housing 18 is formed. Thereby, the pressure of the fluid flowing into the cap 20 via the communication hole 201 is applied to the diaphragm 3 of the other pressure-sensitive unit 12 (on the right in FIG. 12).

The flow rate sensor 10 is provided so that the communication hole 191 may be directed in the direction v in which the fluid flows and the communication hole 201 may be directed in the direction perpendicular to the direction v in which the fluid flows.

In the flow rate sensor 10 provided as described above, atmospheric pressure, dynamic pressure, and static pressure act on the diaphragm 3 of the one pressure-sensitive unit 12 (on the left in FIG. 12). On the other hand, atmospheric pressure and static pressure act on the diaphragm 3 of the other pressure-sensitive unit 12 (on the right in FIG. 12).

Therefore, the dynamic pressure may be obtained from the difference between the pressure acting on the diaphragm 3 of the one pressure-sensitive unit 12 (on the left in FIG. 12) and the pressure acting on the diaphragm 3 of the other pressure-sensitive unit 12 (on the right in FIG. 12). Further, the flow rate may be obtained according to the Bernoulli's law.

According to the above described flow rate sensor 10 of the sixth embodiment, the detection accuracy may also be made better.

As above, the physical quantity detectors of the invention have been explained with reference to the illustrated embodiments, and the invention is not limited to those, but the configurations of the respective parts may be replaced with arbitrary configurations having the same functions. Further, the other arbitrary configurations and steps may be added. Furthermore, the invention may be a combination of arbitrary two or more configurations (features) of the above described embodiments.

The entire disclosure of Japanese Patent Application No. 2011-248026, filed Nov. 11, 2011 is expressly incorporated by reference herein.

What is claimed is:

1. A physical quantity detector comprising:
a pressure receiving unit including a displacement part that is displaced under pressure and an outer circumferential part provided on an outer circumference of the displacement part;
a holding member including a fixing part in an circumferential shape in a plan view, and a projection part that projects from an inner circumference of the fixing part toward a center in the plan view;
the projection part having an opening and provided on one surface side of the pressure receiving unit, and the fixing part holding the outer circumferential part so that at least one part of the displacement part at the one surface side of the pressure receiving unit may be located within the opening in the plan view from the projection part side,
a support fixed to the projection part; and
a pressure-sensitive device including a first base part fixed to the at least one part of the displacement part, a second base part fixed to the support, and a pressure-sensitive part provided between the first base part and the second base part, the first base part and the second base part stood in line in a direction in which the displacement part is displaced.

2. The physical quantity detector according to claim 1, wherein the projection part is provided in an annular shape in the fixing part.

3. The physical quantity detector according to claim 1, wherein the support includes:
a column member stood in the projection part; and
a beam member connecting the column member and the second base part.

4. The physical quantity detector according to claim 3, wherein the column member is provided within a region of the displacement part in the plan view from the direction in which the displacement part is displaced.

5. The physical quantity detector according to claim 3, wherein the column member and the beam member are formed using different materials from each other.

6. The physical quantity detector according to claim 5, wherein the pressure-sensitive device is formed using a piezoelectric material, and
the column member is formed using a material having a coefficient of thermal expansion equal to or close to that of the piezoelectric material.

7. The physical quantity detector according to claim 5, wherein the beam member is formed using a material having a coefficient of thermal expansion equal to or close to that of at least one of the holding member and the pressure receiving unit.

8. The physical quantity detector according to claim 7, wherein the holding member is formed using a material having a coefficient of thermal expansion equal to or close to that of a constituent material of the pressure receiving unit.

9. The physical quantity detector according to claim 1, wherein a direction in which a part where the support is fixed in the projection part and the first base part are arranged is orthogonal to the direction in which the displacement part is displaced.

10. The physical quantity detector according to claim 1, further comprising a fixing member joined to the displacement part,
wherein the first base part is fixed to the fixing member.

11. The physical quantity detector according to claim 1, wherein the pressure-sensitive device includes one or more vibration beams in the pressure-sensitive part.

12. The physical quantity detector according to claim 1, wherein the pressure-sensitive device is a thickness-shear mode vibrator.

* * * * *